US012742957B2

(12) United States Patent
Machi et al.

(10) Patent No.: US 12,742,957 B2
(45) Date of Patent: Sep. 22, 2026

(54) SENSOR ATTACHMENT BRACKET AND SENSOR ASSEMBLY

(71) Applicant: ISUZU MOTORS LIMITED, Yokohama (JP)

(72) Inventors: Sadaharu Machi, Fujisawa (JP); Yohei Sasaki, Fujisawa (JP); Yoshiki Natsume, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 19/286,520

(22) Filed: Jul. 31, 2025

(65) Prior Publication Data

US 2026/0072268 A1 Mar. 12, 2026

(30) Foreign Application Priority Data

Sep. 9, 2024 (JP) ................................ 2024-154881

(51) Int. Cl.
*G02B 23/24* (2006.01)
*G01D 11/24* (2006.01)

(52) U.S. Cl.
CPC ....... *G02B 23/2476* (2013.01); *G01D 11/245* (2013.01)

(58) Field of Classification Search
CPC ..... B60R 11/047; B60R 11/05; B60R 21/013; G02B 23/2476; G01D 11/245
See application file for complete search history.

(56) References Cited

U.S. PATENT DOCUMENTS 7,481,407 B2 * 1/2009 Kim ..................... B60G 17/019 248/220.21
9,358,939 B2 * 6/2016 Ohashi .................... B60R 16/03
10,173,623 B1 * 1/2019 Meksavan ............... G01S 13/87
10,446,987 B2 * 10/2019 Fukuhara ........... H01R 13/6683
11,239,541 B2 * 2/2022 Yu ......................... G01S 13/931
11,760,274 B2 * 9/2023 Higashimachi ......... B60R 11/04 248/237
11,796,356 B2 * 10/2023 Yamaji .................... G01S 7/521
12,092,260 B2 * 9/2024 Kim ........................ G01S 7/027
2013/0206928 A1 * 8/2013 Murakoshi ............ F16L 3/1025 248/65
2015/0318608 A1 * 11/2015 Tran ..................... H01Q 1/1207 343/872
2019/0256009 A1 * 8/2019 Miwa .................... G01S 13/931

FOREIGN PATENT DOCUMENTS

JP 2014061874 A 4/2014
JP 2018134936 A 8/2018
JP 2020016537 A 1/2020

* cited by examiner

*Primary Examiner* — Karen Beck
*Assistant Examiner* — Caitlin Anne Miller
(74) *Attorney, Agent, or Firm* — The Roy Gross Law Firm, LLC; Roy D. Gross

(57) ABSTRACT

An object of the present disclosure is to provide a sensor attachment bracket and a sensor assembly capable of accurately attaching a sensor. A sensor attachment bracket and a sensor assembly include a base bracket formed of a plate-shaped member and a sensor-mounting-position ensuring bracket formed by bending a plate-shaped member in a hat shape, in which a flange portion of the sensor-mounting-position ensuring bracket and the base bracket are joined by spot welding.

6 Claims, 12 Drawing Sheets

SENSOR ATTACHMENT BRACKET AND SENSOR ASSEMBLY

CROSS REFERENCE TO RELATED APPLICATIONS

This application is entitled to (or claims) the benefit of Japanese Patent Application No. 2024-154881, filed on Sep. 9, 2024, the disclosure of which including the specification, drawings and abstract is incorporated herein by reference in its entirety.

TECHNICAL FIELD

The present disclosure relates to a sensor attachment bracket and a sensor assembly.

BACKGROUND ART

A vehicle is provided with a plurality of sensors for detecting an obstacle, a person, or the like around the vehicle. FIG. 12 shows an example of a structure of sensor attachment bracket 200 according to the related art for attaching sensor 201 to a vehicle. A plurality of metal-made sensor-mounting-position ensuring brackets 204 are welded to metal-made base bracket 203. Each of sensor-mounting-position ensuring brackets 204 includes one top surface portion 205 having a quadrangular shape and two side surface portions 206 having a triangular shape, and is formed by bending a plate-shaped member such that the plate-shaped member has a section in a substantially U-shape. Side surface portions 206 and tangential portions 210 of base bracket 203 are linearly welded and joined to each other by arc welding or the like.

A plurality of bolts 207 (three bolts in FIG. 12) are attached to top surface portion 205 of sensor-mounting-position ensuring bracket 204. Meanwhile, a plurality of attachment holes 202 (three holes in FIG. 12) are formed in sensor 201. Then, bolts 207 are inserted into attachment holes 202 and fastened with nuts 208, so that sensor 201 is fastened to sensor-mounting-position ensuring bracket 204.

In the example of FIG. 12, two sensor-mounting-position ensuring brackets 204 are attached to base bracket 203 vertically. Moreover, the normal direction of top surface portion 205 of each of sensor-mounting-position ensuring brackets 204 is different from each other. For example, top surface portion 205 of upper sensor-mounting-position ensuring bracket 204 faces rightward when viewed from the front, and top surface portion 205 of lower sensor-mounting-position ensuring bracket 204 faces leftward when viewed from the front. The normal direction of top surface portion 205 is determined depending on the shape of side surface portion 206, and the shape of side surface portion 206 is designed such that respective sensors 201 face a range in which an obstacle or the like is to be detected.

SUMMARY OF INVENTION

Technical Problem

In the structure of sensor attachment bracket 200 according to the related art, in a case where one sensor-mounting-position ensuring bracket 204 is attached to base bracket 203, two tangential portions 210 are linearly welded. In addition, in the welding of the metals, thermal strain is generally generated in a welded portion, and base bracket 203 or sensor-mounting-position ensuring bracket 204 may be deformed. As a result, there is a possibility that the facing direction of sensor 201 attached to sensor-mounting-position ensuring bracket 204 deviates from the designed direction, and there is a concern that the vehicle cannot accurately detect the obstacle, the person, or the like around the vehicle in a case where the facing direction of sensor 201 deviates.

An object of the present disclosure is to provide a sensor attachment bracket capable of accurately attaching a sensor.

Solution to Problem

A sensor attachment bracket according to the present disclosure includes: a base bracket formed of a plate-shaped member; and a sensor-mounting-position ensuring bracket formed by bending a plate-shaped member in a hat shape, in which a flange portion of the sensor-mounting-position ensuring bracket and the base bracket are joined to each other by spot welding.

Advantageous Effects of Invention

With the sensor attachment bracket according to the present disclosure, since the sensor-mounting-position ensuring bracket is joined to the base bracket by spot welding, the thermal strain is less likely to be generated as compared to the structure according to the related art in which linear welding is performed, and the attachment accuracy of the sensor is improved. In addition, since the number of welded portions can be reduced as compared to the structure according to the related art, it is possible to efficiently attach the sensor by reducing the man-hours for attaching the sensor.

DESCRIPTION OF EMBODIMENTS

Hereinafter, embodiments of the present disclosure will be described with reference to the accompanying drawings. All the embodiments described below show a specific example of the present disclosure. Therefore, each component, the arrangement position and the connection form of each component, and the like illustrated in the following embodiments are examples and are not intended to limit the present disclosure. In addition, components that are not described in the independent claims among components in the following embodiments are described as optional components.

Each figure is a schematic diagram and is not necessarily a strict illustration. In each figure, the same symbol is attached to a substantially identical configuration, and redundant explanations may be omitted or simplified.

Figure 1:
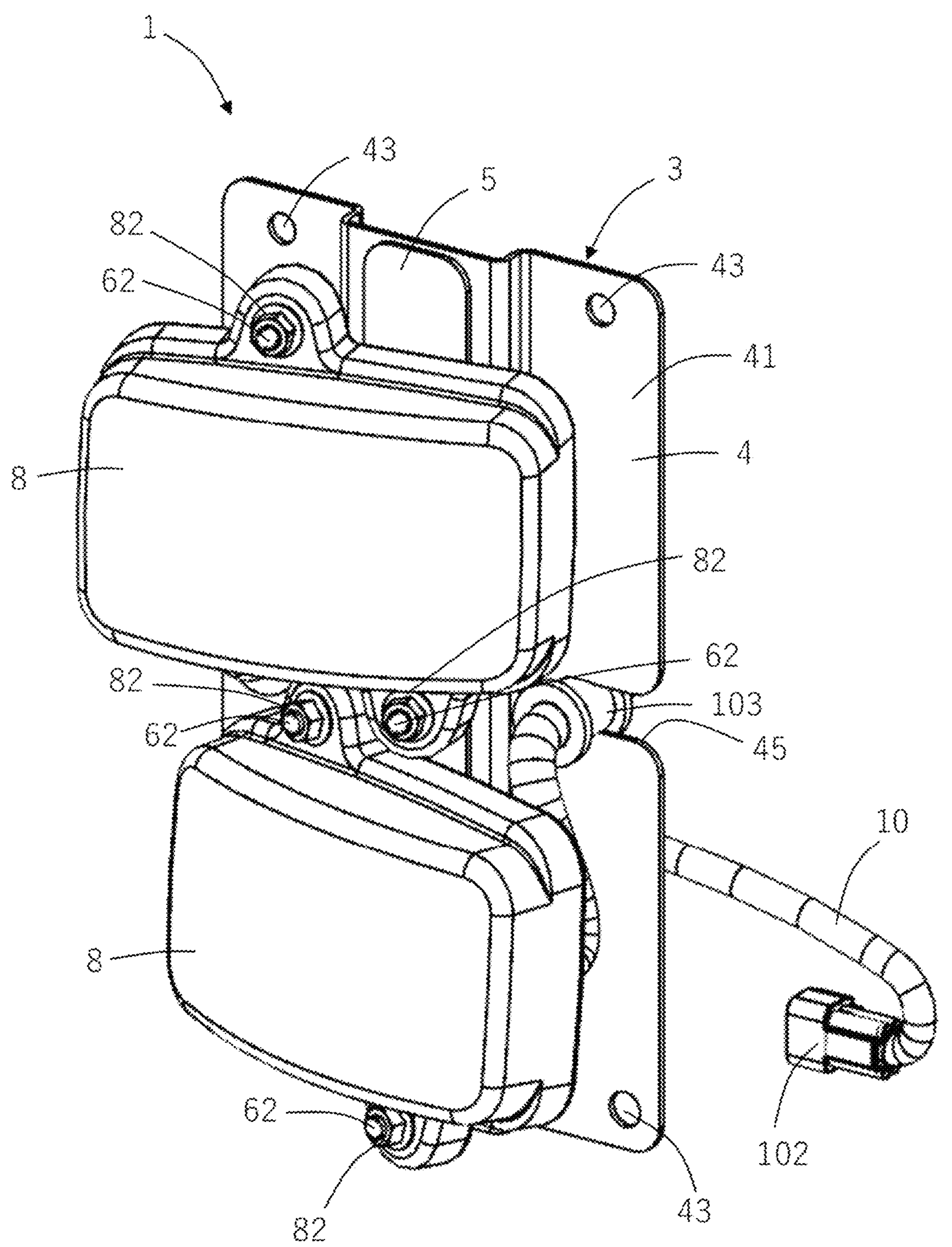
FIG. 1 illustrates a sensor assembly.
Figure 2:
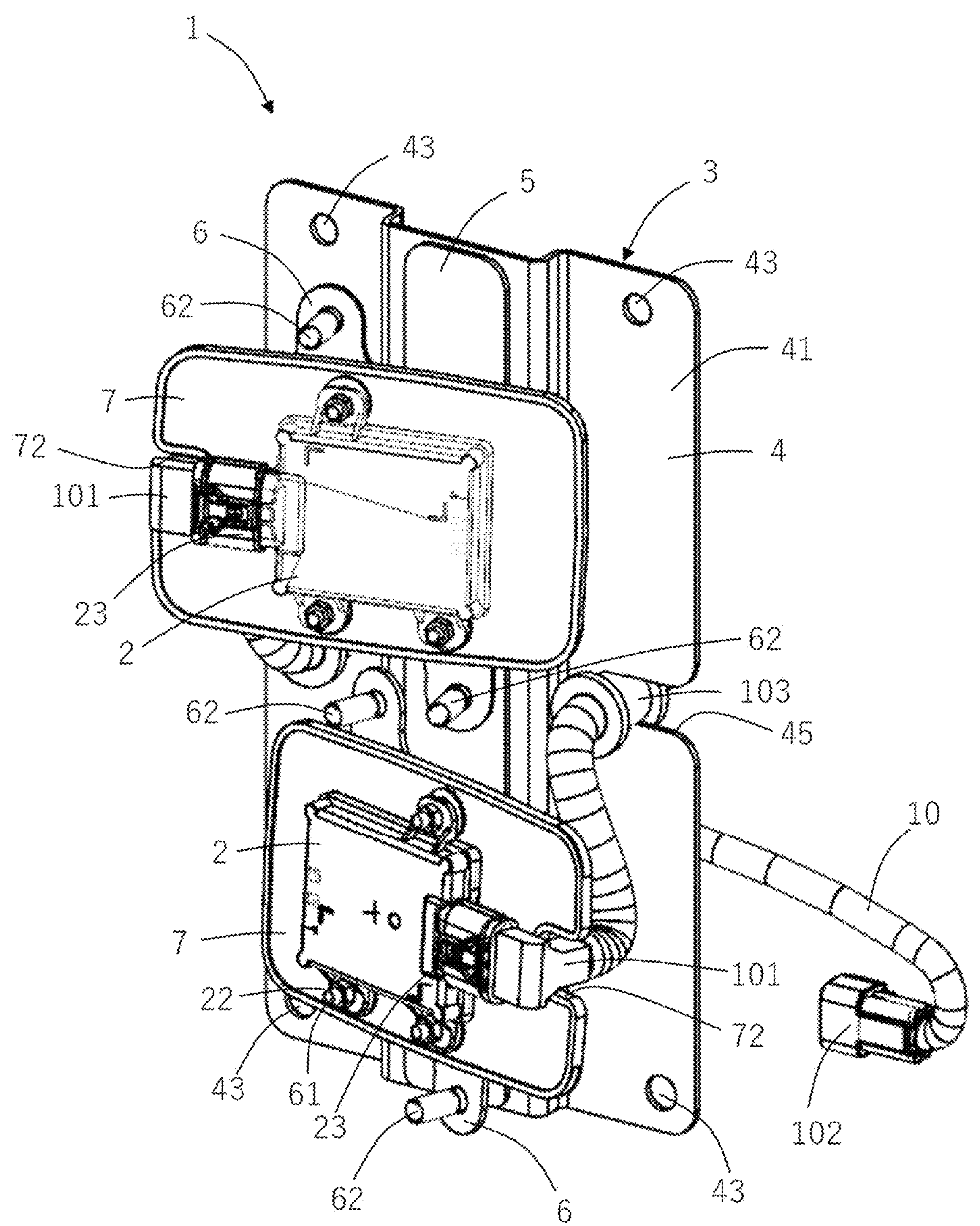
FIG. 2 illustrates the sensor assembly in a state in which a cover is detached.
Figure 3:
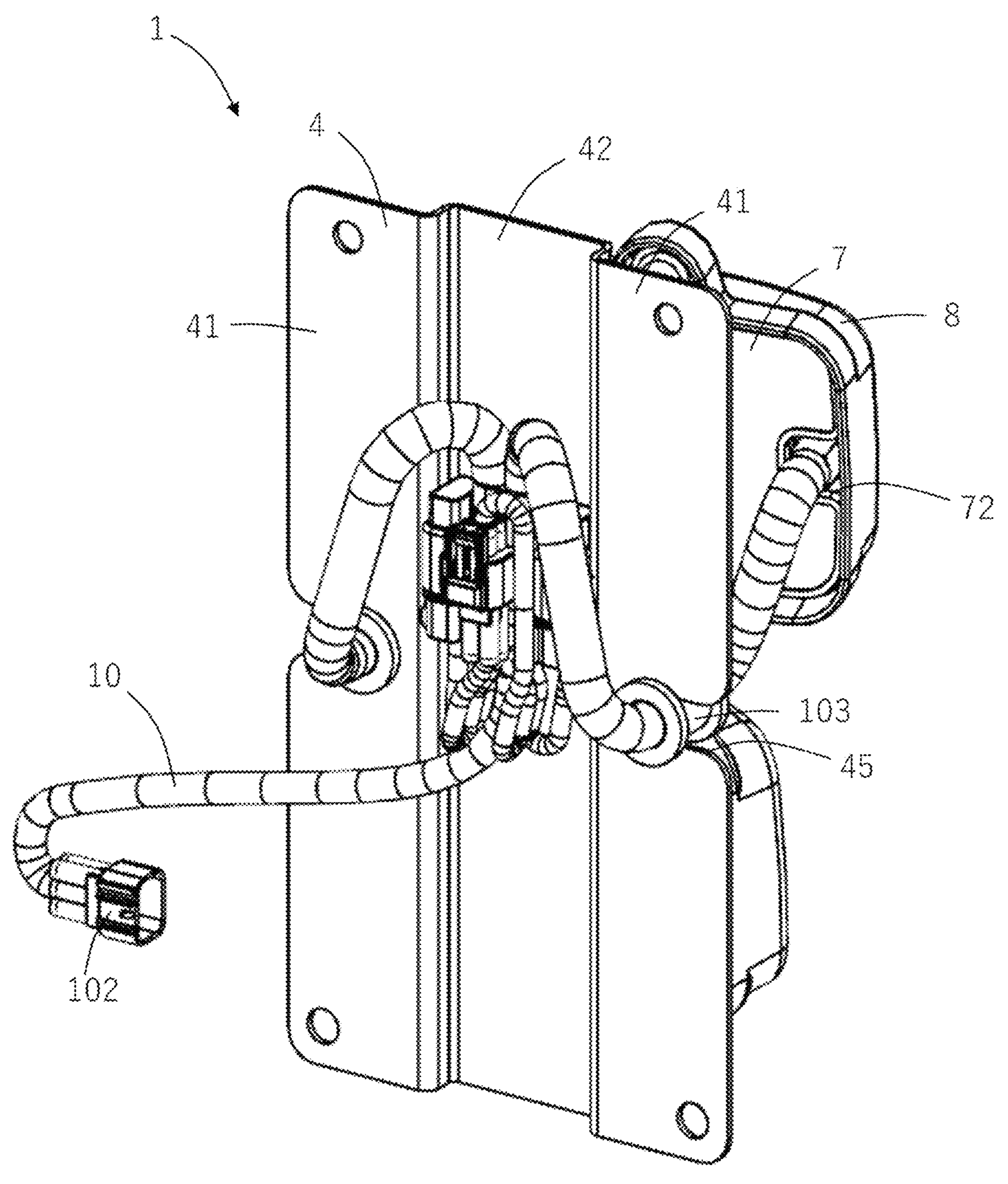
FIG. 3 illustrates a back side of the sensor assembly of FIG. 1.
Figure 4:
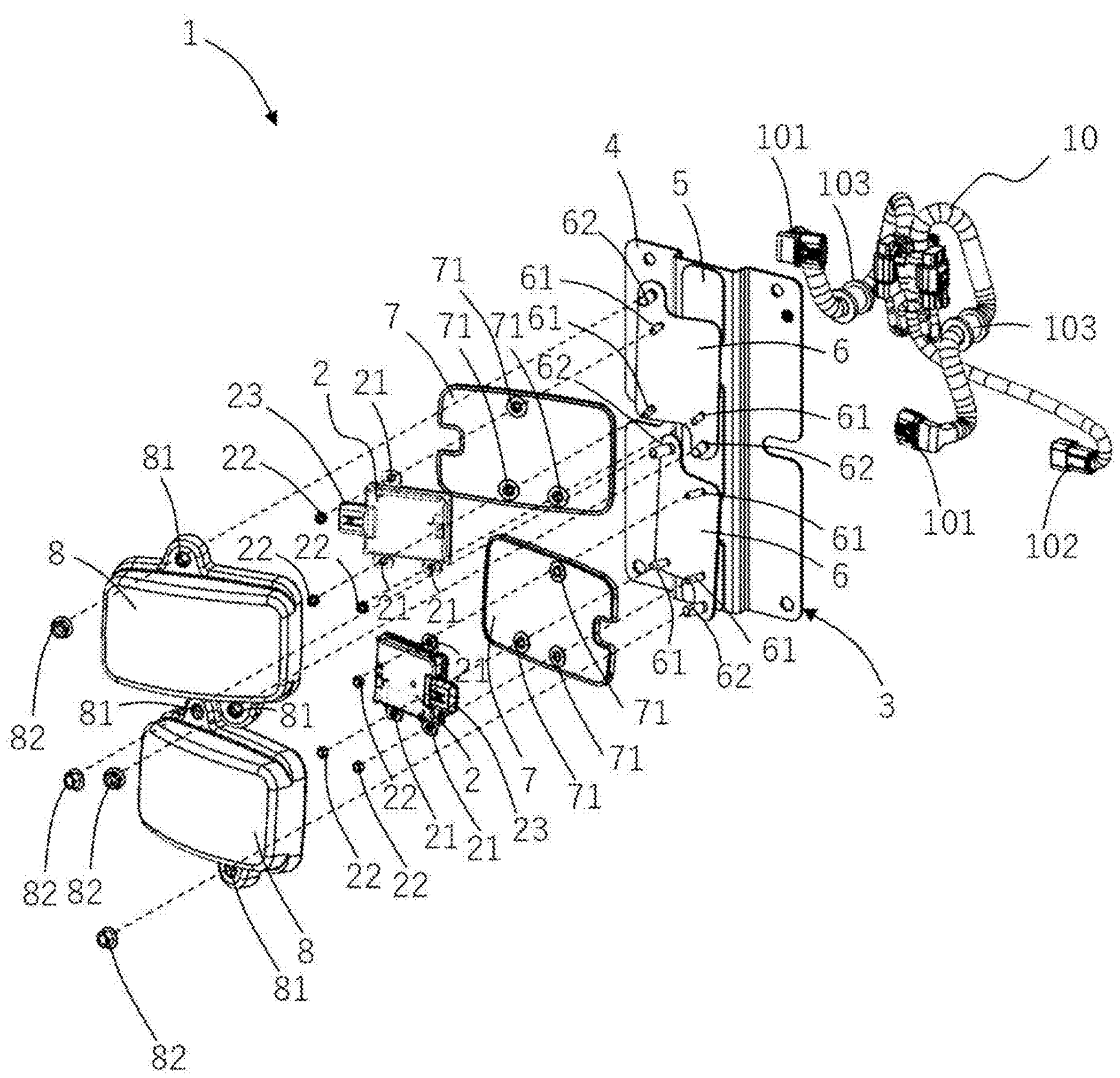
FIG. 4 is an exploded diagram of the sensor assembly of FIG. 1.
Figure 5:
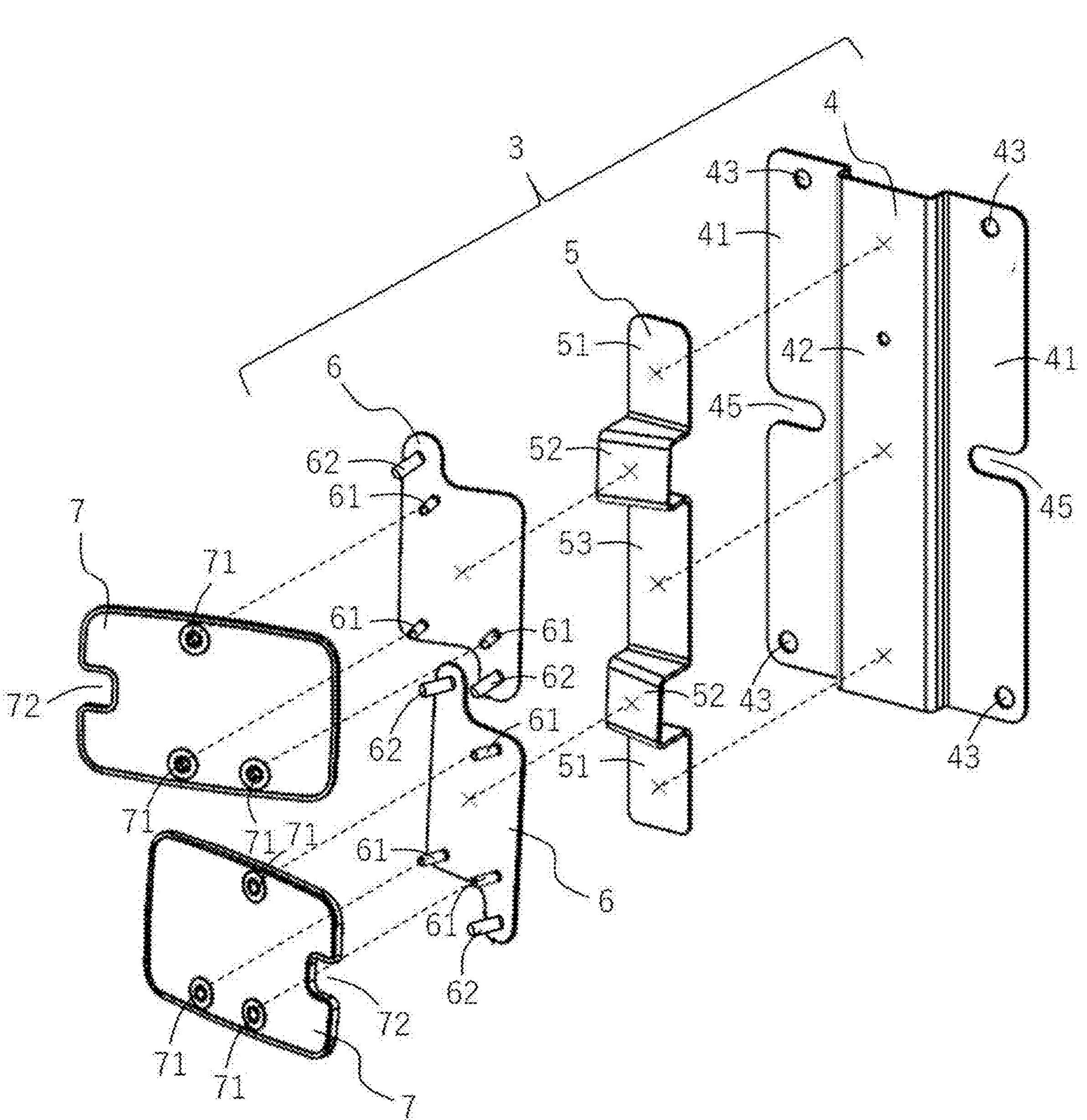
FIG. 5 is an exploded diagram of a sensor attachment bracket.
Figure 6:
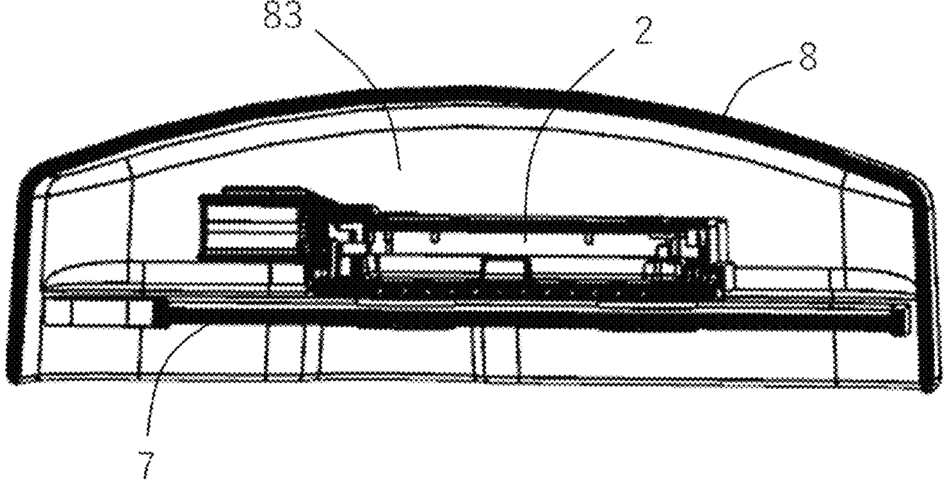
FIG. 6 is a cross-sectional diagram illustrating the inside of the cover.
Figure 7:
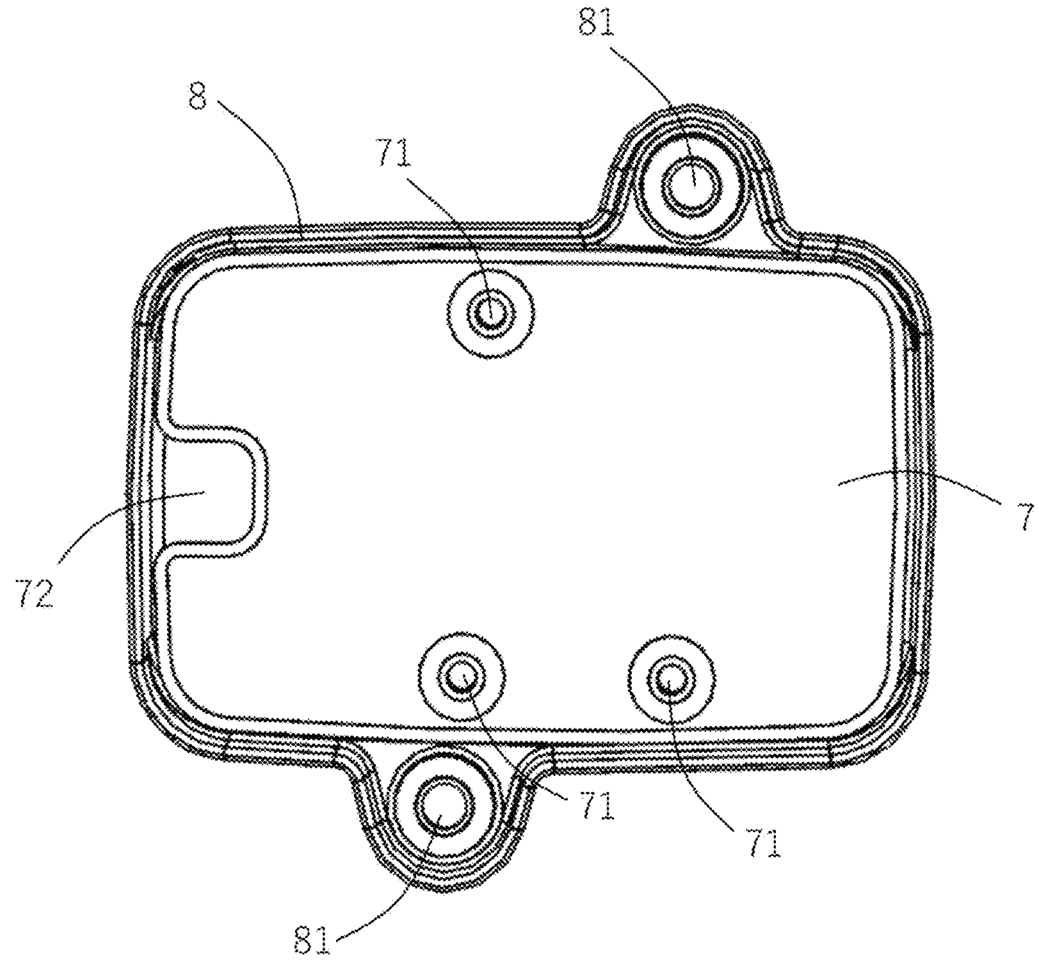
FIG. 7 is a rear diagram showing the cover and a resin plate.
Figure 8:
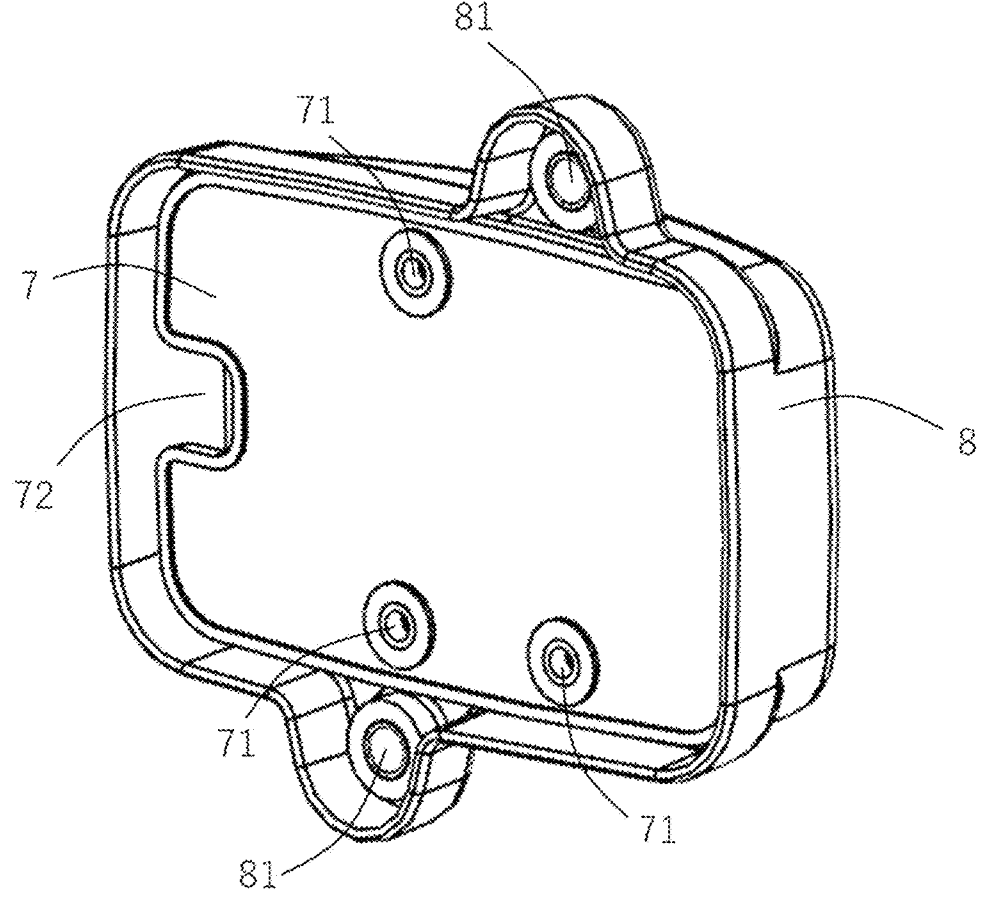
FIG. 8 is a rear perspective diagram showing the cover and the resin plate.

FIGS. 1 to 8 are diagrams showing Embodiment 1 of the sensor assembly according to the present disclosure, FIG. 1 is a perspective diagram of sensor assembly 1, FIG. 2 illustrates sensor assembly 1 in a state in which cover 8 is detached, FIG. 3 illustrates a back side of sensor assembly 1, FIG. 4 is an exploded diagram of sensor assembly 1, FIG. 5 is an exploded diagram of sensor attachment bracket 3, FIG. 6 is a cross-sectional diagram illustrating the inside of cover 8, FIG. 7 is a rear diagram showing resin plate 7 and cover 8, and FIG. 8 is a rear perspective diagram showing resin plate 7 and cover 8.

Sensor assembly 1 includes sensor attachment bracket 3 and sensor 2 attached to sensor attachment bracket 3. Sensor attachment bracket 3 includes base bracket 4, sensor-mounting-position ensuring bracket 5, and sensor pedestal bracket 6.

Base bracket 4 is a plate-shaped member having a hat-shaped cross section cut in a horizontal plane, and includes top surface portion 42 at the center and flange portions 41 formed on both sides of top surface portion 42. Notch portions 45 for locking harness 10 are formed in flange portions 41. Sensor assembly 1 is attached to the vehicle body by attaching base bracket 4 to the vehicle body.

Sensor-mounting-position ensuring bracket 5 is joined to top surface portion 42 by spot welding. As shown in FIG. 5, sensor-mounting-position ensuring bracket 5 has a shape in which a plurality (two in the example shown in the figure) of hat portions are consecutively formed by bending a long plate-shaped member, and includes central flange portion 53 formed in a central portion, a plurality of (two in the example shown in the figure) top surface portions 52 formed on both sides of central flange portion 53, and lateral flange portions 51 formed at both upper and lower end portions.

The normal directions of the plurality of top surface portions 52 are different from each other. For example, upper top surface portion 52 faces rightward when viewed from the front, and lower top surface portion 52 faces leftward when viewed from the front. The orientation of each top surface portion 52 is designed according to a direction in which sensor 2 to be attached detects an obstacle or the like.

In this embodiment, central flange portion 53 at one location and lateral flange portions 51 at two locations, that is, the flange portions at a total of three locations are joined to top surface portion 42 of base bracket 4 by spot welding (indicated by x marks and dotted lines in FIG. 5). The number of top surface portions 52 is designed according to the number of sensors 2 to be attached, and central flange portions 53 are formed between top surface portions 52 by the number smaller than the number of top surface portions 52 by one. Therefore, sensor-mounting-position ensuring bracket 5 and base bracket 4 are joined to each other by spot welding as many as the total number of central flange portions 53 and lateral flange portions 51. That is, the following holds true:

Number of spot weldings=Number of sensors attached−1+Number of lateral flange portions=Number of sensors attached+1.

Figure 12:
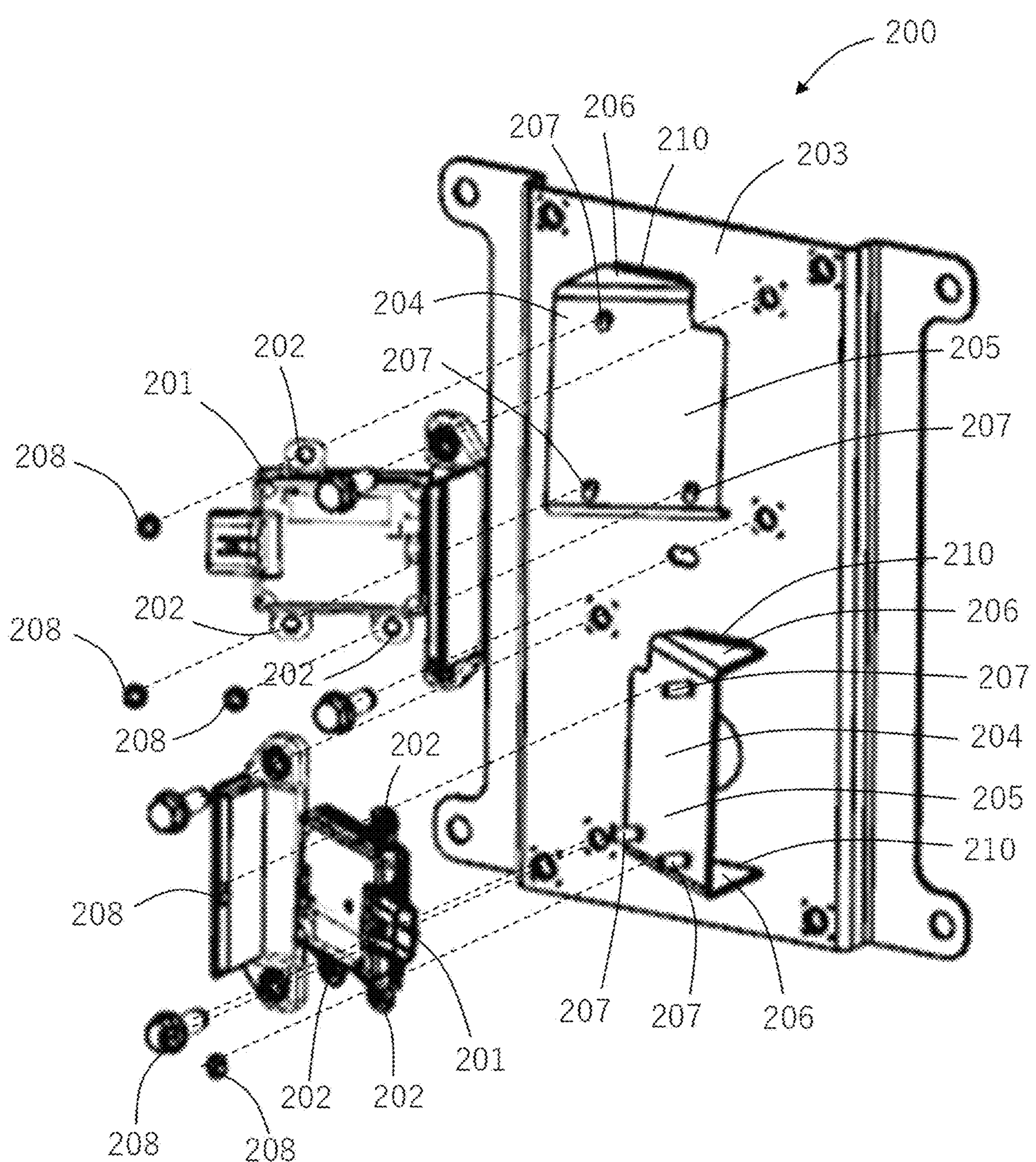
FIG. 12 illustrates a sensor attachment bracket according to the related art.

In the related art shown in FIG. 12, in a case where sensor-mounting-position ensuring bracket 204 is joined to base bracket 203, two tangential portions 210 of one sensor-mounting-position ensuring bracket 204 are welded, and welding is performed twice the number of locations of sensors 201 attached. However, in this embodiment, since welding and joining need only be performed at the number of sensors 2 to be attached plus one, deformation due to thermal strain can be suppressed, and the man-hours for work can be reduced.

In addition, in the related art, sensor-mounting-position ensuring bracket 204 and base bracket 203 are linearly welded by arc welding or the like, but, in this embodiment, sensor-mounting-position ensuring bracket 5 and base bracket 4 are point-welded to each other by spot welding, so that the amount of metal to be melted by welding is small, the thermal strain is unlikely to be generated, and the work is easy and can be completed in a short time.

Metal-made sensor pedestal bracket 6 is joined to top surface portion 52 of sensor-mounting-position ensuring bracket 5 by spot welding. A substantially center portion of sensor pedestal bracket 6 is joined to top surface portion 52 of sensor-mounting-position ensuring bracket 5 (indicated by x marks and dotted lines in FIG. 5). Sensor pedestal bracket 6 is a bracket for attaching and supporting sensor 2, and has substantially the same size as sensor 2. Sensor pedestal bracket 6 is provided with first bolts 61 (three bolts in the example shown in the figure) for attaching resin plate 7 and sensor 2, and second bolts 62 (two bolts in the example shown in the figure) for attaching cover 8.

Resin plate 7 and sensor 2 are fastened to sensor pedestal bracket 6. Resin plate 7 is a resin-made plate-shaped member, and is formed to be larger than sensor pedestal bracket 6. Attachment holes 71 into which first bolts 61 of sensor pedestal bracket 6 are inserted, and notch portion 72 in which harness 10 connected to sensor 2 is locked are formed in resin plate 7.

Attachment holes 21 into which first bolts 61 of sensor pedestal bracket 6 are inserted are formed in peripheral portions of sensor 2. First bolts 61 of sensor pedestal bracket 6 are inserted into attachment holes 71 of resin plate 7 and attachment holes 21 of sensor 2, and resin plate 7 and sensor 2 are fastened together by nuts 22.

Cover 8 is a resin-made member that covers and protects sensor 2. Attachment holes 81 into which second bolts 62 of sensor pedestal bracket 6 are inserted are formed in peripheral portions of cover 8. Cover 8 covers sensor 2 and accommodates sensor 2 in space 83 formed by cover 8 and resin plate 7 (see FIG. 6). That is, the internal space of cover 8 is closed by resin plate 7 by fitting resin plate 7 to cover 8.

Harness 10 connects sensor 2 and a vehicle control apparatus or the like (not shown). One end portion 101 of harness 10 is connected to connector 23 of sensor 2, and other end portion 102 is connected to the vehicle control apparatus, another harness, or the like (not shown). The vicinity of one end portion 101 of harness 10 is locked to notch portion 72 formed in resin plate 7 and is pulled out from space 83 of cover 8 to the outside of cover 8. In addition, intermediate portion 103 is locked to notch portion 45 formed in base bracket 4 and is taken to a back surface side of base bracket 4.

Sensor 2 is fastened to a surface of resin plate 7 by first bolts 61 and nuts 22 (see FIG. 4 and the like). In a state in which sensor 2 is attached to resin plate 7, cover 8 covers resin plate 7 such that resin plate 7 is fitted to the inside of the cover, and is fastened to sensor pedestal bracket 6 by second bolts 62 and nuts 82 (see FIG. 4 and the like).

Cover 8 is formed in a recessed shape that can accommodate sensor 2 and resin plate 7 therein (see FIG. 6). Cover 8 covers sensor 2 such that resin plate 7 to which sensor 2 is attached is fitted to cover 8, so that sensor 2 is accommodated in space 83 formed by resin plate 7 and cover 8.

In a case where sensor 2 is directly attached to metal-made sensor pedestal bracket 6, the distance between sensor 2 and sensor pedestal bracket 6 is shortened, and metal-made sensor pedestal bracket 6 may affect radio wave emission of sensor 2. However, by interposing resin plate 7 between sensor pedestal bracket 6 and sensor 2, the distance between sensor pedestal bracket 6 sensor 2 is increased, and the radio wave emission of sensor 2 is less likely to be affected by metal-made sensor pedestal bracket 6.

It is desirable that metal-made sensor pedestal bracket 6 is made as small as possible in order to reduce the influence on the radio wave emission of sensor 2. On the other hand, it is desirable that cover 8 covering sensor 2 is provided at a predetermined distance from sensor 2 in order to reduce the influence on the radio wave emission of sensor 2. Therefore, a gap is generated between the periphery of sensor pedestal bracket 6 and the periphery of cover 8. However, in this embodiment, since resin plate 7 having a size to be fitted to cover 8 is provided, the gap between the periphery of sensor pedestal bracket 6 and the periphery of cover 8 is closed by resin plate 7, so that foreign matter is prevented from entering the gap and adhering to sensor 2.

Figure 9:
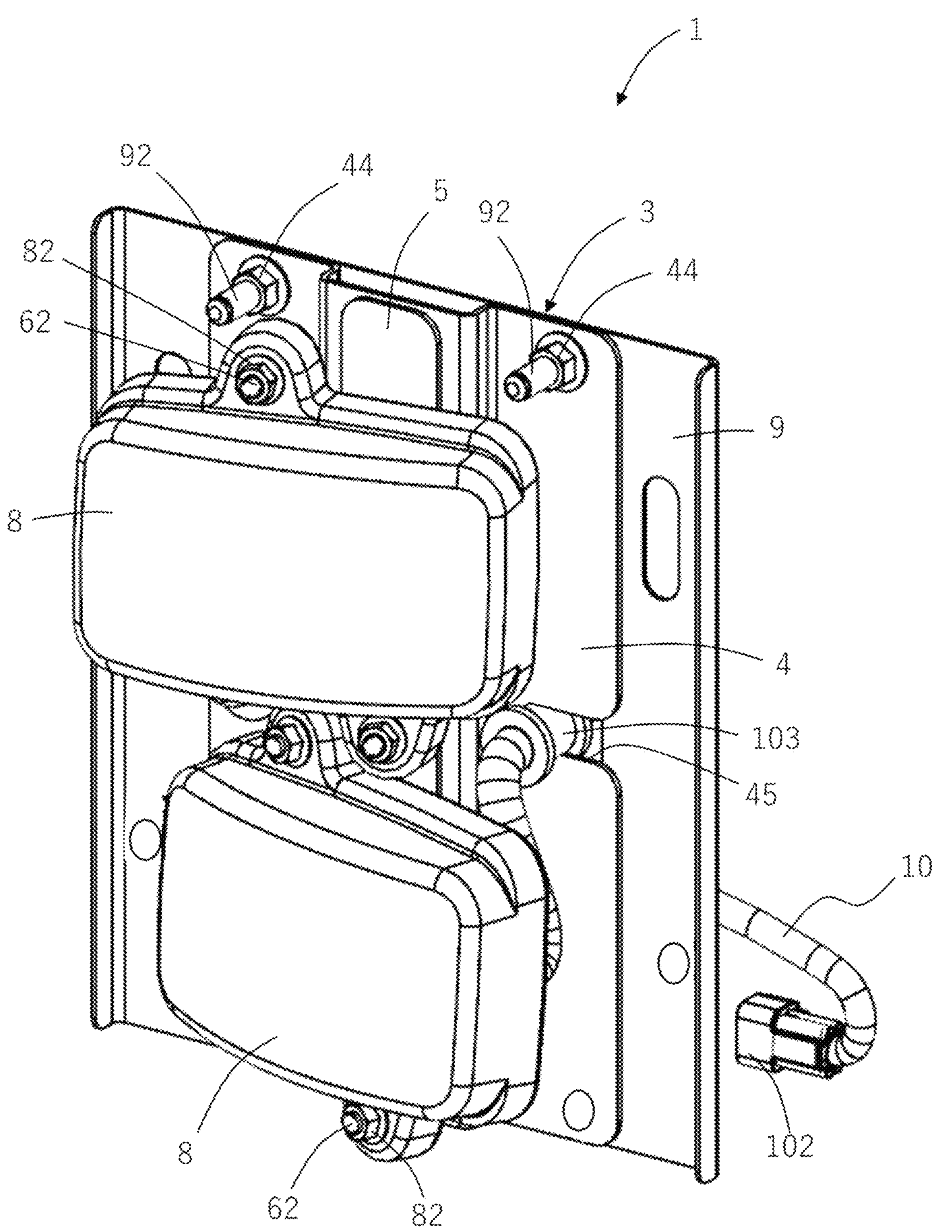
FIG. 9 illustrates the sensor assembly to which a frame-shaped bracket is attached.
Figure 10:
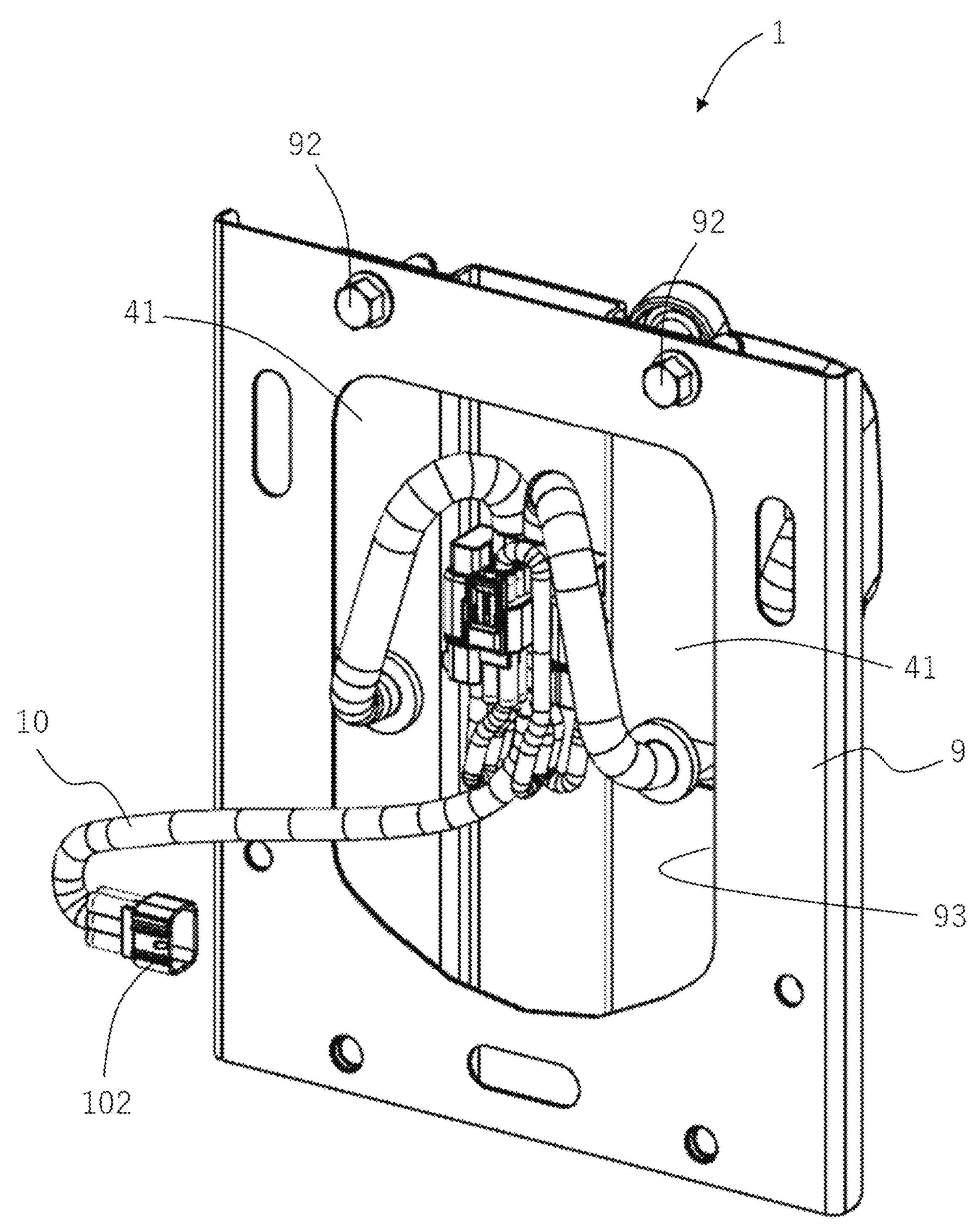
FIG. 10 illustrates a back side of the sensor assembly of FIG. 9.
Figure 11:
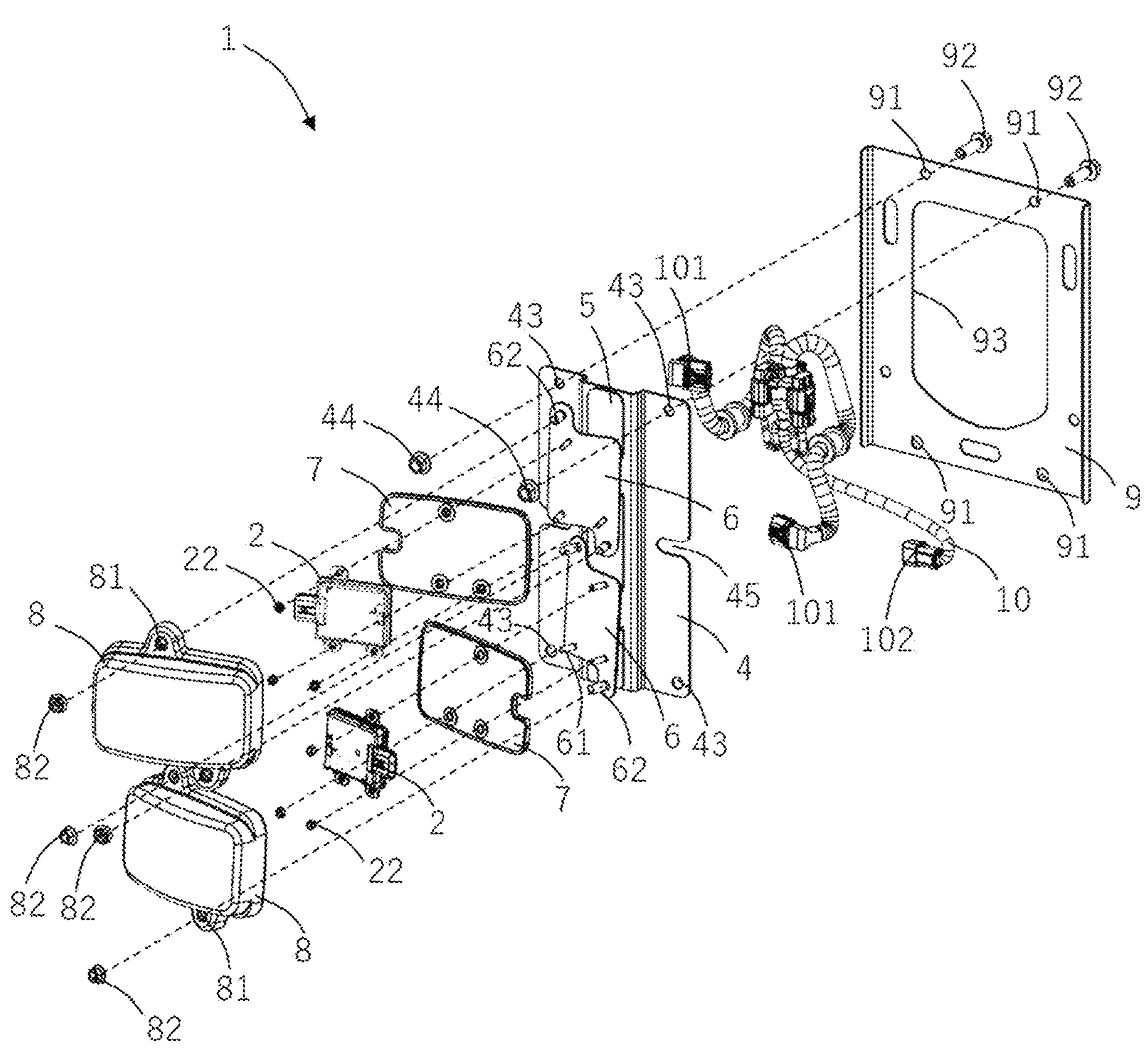
FIG. 11 is an exploded diagram of the sensor assembly of FIG. 9.

FIGS. 9 to 11 are diagrams showing Embodiment 2 of the sensor assembly according to the present disclosure, FIG. 9 is a perspective diagram of a sensor assembly, FIG. 10 illustrates a back side of the sensor assembly, and FIG. 11 is an exploded diagram of the sensor assembly. In this embodiment, frame-shaped bracket 9 is added to the sensor assembly of Embodiment 1.

A plurality of (four in the example shown in the figure) attachment holes 91 for inserting a bolt are formed in frame-shaped bracket 9. In addition, a plurality of (four in the example shown in the figure) attachment holes 43 for inserting bolts are formed in base bracket 4. Then, a plurality of (two in the example shown in the figure) bolts 92 are inserted into attachment holes 91 and attachment holes 43, and nuts 44 are tightened to fasten frame-shaped bracket 9 to base bracket 4. The number of bolts 92 is appropriately selected within the range of the number of attachment holes 91.

Opening portion 93 is formed in frame-shaped bracket 9. Harness 10 connected to sensor 2 is locked to notch portion 72 and passed to the back side of resin plate 7, and intermediate portion 103 is further locked to notch portion 45 and passed to the back side of base bracket 4. Then, in a case where frame-shaped bracket 9 is fastened to base bracket 4, harness 10 is inserted through opening portion 93 and passed to the back side of frame-shaped bracket 9.

Frame-shaped bracket 9 is located to close the opening portions of notch portions 45 at the vicinities of intermediate portions 103 of harnesses 10. Therefore, frame-shaped bracket 9 prevents harness 10 from falling off from notch portions 45.

In a case where sensor assembly 1 is attached to the vehicle body, frame-shaped bracket 9 is attached to the vehicle body (not shown) with a fastening member such as a bolt and a nut. Therefore, since frame-shaped bracket 9 prevents harnesses 10 from falling off from notch portions 45 and also functions as a bracket for attaching sensor assembly 1 to the vehicle body, the number of components can be reduced and the man-hours for attachment can be reduced.

As described above, sensor attachment bracket 3 according to the present disclosure includes base bracket 4 formed of the plate-shaped member, and sensor-mounting-position ensuring bracket 5 formed by bending the plate-shaped member in the hat shape, in which flange portions 51 and 53 of sensor-mounting-position ensuring bracket 5 and base bracket 4 are joined to each other by spot welding. Thus, the thermal strain is suppressed as compared to the related art in which sensor-mounting-position ensuring bracket 204 and base bracket 203 are linearly joined to each other by arc welding or the like, and the attachment accuracy of the sensor is improved, and the man-hours for work are reduced.

In addition, in sensor attachment bracket 3 according to the present disclosure, in a case where the plurality of sensors 2 are attached, a plurality of hat portions is formed in sensor-mounting-position ensuring bracket 5 such that sensor-mounting-position ensuring bracket 5 includes lateral flange portions 51 formed at both end portions, a plurality of top surface portions 52, and one or more central flange portions 53 formed between the plurality of top surface portions 52, and lateral flange portions 51 and central flange portions 53 are joined to base bracket 4 by spot welding. Thus, the number of welded portions with respect to the number of sensors 2 can be reduced as compared to the related art. Accordingly, the thermal strain is suppressed, the attachment accuracy of the sensor is improved, and the man-hours for work are reduced.

In addition, in sensor attachment bracket 3 according to the present disclosure, since the normal directions of top surface portions 52 of the plurality of hat portions are different from each other, the plurality of sensors 2 can be attached in different directions, and the detection range of the obstacle by the sensors can be widened. In addition, the attachment angles of sensors 2 can be varied in various ways by appropriately designing the directions of top surface portions 52.

In addition, since sensor attachment bracket 3 according to the present disclosure includes sensor pedestal bracket 6 fixed to top surface portion 52 of sensor-mounting-position ensuring bracket 5 by spot welding, sensor 2 with a different size can be attached by changing sensor pedestal bracket 6, and the component standardization of base bracket 4 and sensor-mounting-position ensuring bracket 5 can be promoted.

In addition, since sensor assembly 1 according to the present disclosure includes sensor attachment bracket 3, resin plate 7 attached to sensor pedestal bracket 6, sensor 2 attached to resin plate 7, harness 10 connected to sensor 2, and resin-made cover 8 that covers sensor 2, the attachment accuracy of sensor 2 is improved, and sensor 2 can be protected by cover 8.

In addition, since sensor assembly 1 according to the present disclosure includes base bracket 4 in which notch portions 45 are formed, and harnesses 10 are locked to notch portions 45, harnesses 10 can be appropriately fixed, and harnesses 10 do not interfere.

In addition, since in sensor assembly 1 according to the present disclosure, frame-shaped bracket 9 in which opening portion 93 is formed is attached to the surface of base bracket 4 opposite to the side to which sensor 2 is attached, and frame-shaped bracket 9 closes the opening portions of notch portions 45, harnesses 10 can be prevented from falling off from notch portions 45 due to vibration or the like of the vehicle.

In addition, since sensor assembly 1 according to the present disclosure includes metal-made sensor pedestal bracket 6, resin plate 7 attached to sensor pedestal bracket 6, sensor 2 attached to resin plate 7, and cover 8 that is fitted to resin plate 7 and that accommodates sensor 2 in space 83 formed together with resin plate 7, the radio wave emission of sensor 2 is less likely to be affected by metal-made sensor pedestal bracket 6, and the gap between the periphery of sensor pedestal bracket 6 and the periphery of cover 8 is closed by resin plate 7, so that foreign matter is prevented from entering the gap and adhering to sensor 2.

In addition, sensor assembly 1 according to the present disclosure includes sensor pedestal bracket 6 provided with first bolts 61 and second bolts 62, resin plate 7 and sensor 2 are fastened together by first bolts 61, and cover 8 is fastened by second bolts 62. Thus, resin plate 7, sensor 2, and cover 8 can be efficiently fixed to sensor pedestal bracket 6 in a small space.

In addition, sensor assembly 1 according to the present disclosure further includes base bracket 4 formed of the plate-shaped member, and sensor-mounting-position ensuring bracket 5 that is formed by bending the plate-shaped member in the hat shape and in which the flange portions and base bracket 4 are joined to each other by spot welding, in which sensor pedestal bracket 6 is joined to hat-shaped top surface portion 52 of sensor-mounting-position ensuring bracket 5 by spot welding. Thus, the influence of thermal strain due to welding can be reduced, and sensor 2 can be accurately attached.

INDUSTRIAL APPLICABILITY

The sensor attachment bracket and the sensor assembly according to the present disclosure can be suitably used in a case where various sensors are attached to a vehicle body.

The invention claimed is:

1. A sensor attachment bracket, comprising:

a base bracket formed of a plate-shaped member and attached to a vehicle body; and a sensor-mounting-position ensuring bracket formed by bending a plate-shaped member in a hat shape, wherein a flange portion of the sensor-mounting-position ensuring bracket and the base bracket are joined to each other by spot welding;

the sensor-mounting-position ensuring bracket includes a plurality of hat portions formed so as to include lateral flange portions formed at both end portions, a plurality of top surface portions, and one or more central flange portions formed between the plurality of top surface portions;

the sensor-mounting-position ensuring bracket is joined to the base bracket by the spot welding at one location on each of the lateral flange portions and each of the one or more central flange portions;

a plurality of sensors are attached to the top surface portions respectively; and a total number of the spot welds joining the sensor-mounting-position ensuring bracket and the base bracket is one greater than a total number of the sensors attached to the sensor-mounting-position ensuring bracket.

2. The sensor attachment bracket according to claim 1, wherein normal directions of the plurality of top surface portions are different from each other.

3. The sensor attachment bracket according to claim 1, further comprising: at least one sensor pedestal bracket fixed to at least one the plurality of the top surface portions of the sensor-mounting-position ensuring bracket by spot welding.

4. A sensor assembly, comprising:

the sensor attachment bracket according to claim 3;

a resin plate attached to the sensor pedestal bracket;

a sensor attached to the resin plate;

a harness connected to the sensor; and a resin-made cover that covers the sensor.

5. The sensor assembly according to claim 4, wherein:

a notch portion is formed in the base bracket, and the harness is locked to the notch portion.

6. The sensor assembly according to claim 5, wherein:

a frame-shaped bracket in which an opening portion is formed is attached to a surface of the base bracket opposite to a side to which the sensor is attached, and the frame-shaped bracket closes an opening portion of the notch portion.

* * * * *